US012553668B2

(12) United States Patent
Hung

(10) Patent No.: US 12,553,668 B2
(45) Date of Patent: Feb. 17, 2026

(54) AIRFLOW ORIFICE ADJUSTING DEVICE OF PACKAGE THERMAL-SHRINKING OVEN

(71) Applicant: Tzu-Chin Hung, Taipei (TW)

(72) Inventor: Tzu-Chin Hung, Taipei (TW)

(*) Notice: Subject to any disclaimer, the term of this patent is extended or adjusted under 35 U.S.C. 154(b) by 367 days.

(21) Appl. No.: 18/456,074

(22) Filed: Aug. 25, 2023

(65) Prior Publication Data

US 2024/0369303 A1 Nov. 7, 2024

(30) Foreign Application Priority Data

May 4, 2023 (TW) ................................ 112204307

(51) Int. Cl.
*B65B 53/06* (2006.01)
*F27D 7/02* (2006.01)

(52) U.S. Cl.
CPC .............. *F27D 7/02* (2013.01); *B65B 53/066* (2013.01); *F27D 2007/023* (2013.01)

(58) Field of Classification Search
CPC .... F27B 9/10; F27B 9/045; F27B 5/16; F27D 7/04; F27D 2007/023; B65B 51/10; B65B 53/02
See application file for complete search history.

(56) References Cited

U.S. PATENT DOCUMENTS 4,092,382 A * 5/1978 Heckman .............. B29C 63/423 264/342 R
6,648,634 B2 * 11/2003 Nava ..................... B65B 53/063 53/442

(Continued)

FOREIGN PATENT DOCUMENTS

CN 107848053 A * 3/2018 ......... H01L 21/6776
FR 2606366 A1 * 5/1988 ............. B65B 9/026

(Continued)

*Primary Examiner* — Gregory A Wilson
(74) *Attorney, Agent, or Firm* — Rosenberg, Klein & Lee

(57) ABSTRACT

An airflow orifice adjusting device of a package thermal-shrinking oven includes at least one airflow orifice board mounted to an inside surface of a hot airflow box of the package thermal-shrinking oven and formed with series of airflow orifices, at least one track board mounted to an outside of the hot airflow box and formed with a plurality of track holes, a plurality of adjusting levers, and a plurality of airflow-blocking adjusting plates mounted to the airflow orifice board and each formed with a plurality of adjusting orifices. Each of the airflow orifices of the airflow orifice board discharges a hot airflow. The adjusting levers each have two ends that are respectively formed as a connecting portion and an operating portion. The connecting portion extends through the track holes of the track board to connect to one end of the airflow-blocking adjusting plate, so that a leftward or rightward horizontal moving operation of the operating portion of the adjusting levers causes the airflow-blocking adjusting plate to correspondingly perform a reversely directed horizontal movement in a rightward or leftward direction. The adjusting orifices of the airflow-blocking adjusting plates respectively correspond to the airflow orifices of the airflow orifice board, so that each of the adjusting orifices may completely or partially match with or completely un-match with a corresponding one of the airflow orifices of the airflow orifice board to adjust a discharging flowrate of the hot airflow and discharging of the hot airflow or not.

9 Claims, 9 Drawing Sheets

(56) References Cited

U.S. PATENT DOCUMENTS

| | | | | |
|---|---|---|---|---|
| 9,434,103 | B2 * | 9/2016 | Fresnel | B29C 61/00 |
| 11,040,794 | B2 * | 6/2021 | Potter | F23D 14/70 |
| 2014/0053515 | A1 * | 2/2014 | Koolhaas | B65B 53/06 53/557 |

FOREIGN PATENT DOCUMENTS

| | | | | | |
|---|---|---|---|---|---|
| KR | 20210152725 | A | * | 12/2021 | H01L 21/67109 |
| SU | 1212874 | A2 | * | 2/1986 | |
| TW | 572035 | U | | 1/2004 | |
| TW | M264479 | U | | 5/2005 | |
| TW | M636117 | U | | 1/2023 | |
| WO | WO-2007065385 | A1 | * | 6/2007 | B65B 63/08 |

* cited by examiner

AIRFLOW ORIFICE ADJUSTING DEVICE OF PACKAGE THERMAL-SHRINKING OVEN

BACKGROUND OF THE INVENTION

1. Field of the Invention

The present invention relates to an airflow orifice adjusting device of a package thermal-shrinking oven, and in particular to an airflow orifice adjusting device that is used in a package thermal-shrinking oven for heat-shrinking packaging of an object and includes a plurality of adjusting levers that are operable for moving airflow-blocking adjusting plates to adjust discharge and flowrate of hot airflows.

2. The Related Arts

Package thermal-shrinking ovens have been widely used in packaging applications for various packaged objects, particularly for various heat-shrinkable film sealed packaged objects that may have different outside contours and shapes, such as meal boxes, noodles, medicinal cuisines, salads, compact disc (CD) boxes, gifts, and so on. Thus, it is necessary to arrange a hot airflow box in a known package thermal-shrinking oven, and airflow orifices are formed in the hot airflow box for discharging hot airflows that are necessary for shrinking of the heat-shrinkable film sealed packaged object. However, the hot airflow flowrate discharged from the airflow orifice of the hot airflow box arranged inside the known package thermal-shrinking oven is not adjustable, and it is also impossible to control the hot airflow not to discharge from a partial area. This makes it impossible for the hot airflow box in the package thermal-shrinking oven to properly adjust, for each airflow orifice of the hot airflow box that corresponds to a heat-shrinking packaging site, the hot airflow flowrate, and also to control it for discharging or not, according to different shapes and sizes of the packaged object and the heat-shrinking property of the heat-shrinkable packaging film. This leads to inhomogeneity of the heat-shrinking packaging quality of the packaged object. This is a problem to be handled for the known package thermal-shrinking oven.

Certain known package thermal-shrinking ovens are designed, according to different shapes and sizes of packaged objects and the heat-shrinking properties of heat-shrinkable package films, to include hot airflow boxes having airflow orifices of different sizes and different locations of distribution, so that in applications for operation with different shapes and sizes of packaged objects and heat-shrinkable package films having different heat-shrinking properties, the hot airflow boxes may be swapped for improving the packaging quality. This, however, greatly increases the installation expenditure and swapping of the hot airflow boxes must be practiced by professional technicians for calibration and replacement. Further, the operation of swapping can only be carried out when the package thermal-shrinking oven is shut down and the internal temperature has dropped to a safe level. This increases the complication and difficulty of the swapping operation of the hot airflow boxes, and additional work hours, human labor, and cost are required, making it lacking industrial utilization and economic value.

Prior art patent documents are known, such as Taiwan Utility Model M636117, which discloses a hot airflow adjusting structure of a typical known package thermal-shrinking oven, wherein a hot airflow adjusting assembly (3) includes an airflow guide seat (31) arranged in an airflow discharging opening (23). An axle (32) extends through the hot airflow adjusting assembly (3), and the axle (32) penetrates through an outside wall (22) of a hot baking box (2) to position the airflow guide seat (31) in the airflow discharging opening (23). An outer section of the axle (32) is correspondingly combined with a control lever (33), and the control lever (33) is provided for adjusting, and positioning, a rotating angle of the airflow guide seat (31). In other words, it is only good for roughly adjusting the direction angle and path of the hot airflow in the hot baking box (2), and it is not possible to control the hot airflow flowrate, and discharge of hot airflow from each one corresponding to the packaging site or not, according to the shape and size of a packaged object passing through the hot baking box (2) and the heat-shrinking property of the heat-shrinkable package film, thus suffering, similar to the prior, the hot airflow box arranged in the interior of the known package thermal-shrinking oven being incapable of properly adjusting, according to different shapes and sizes of packaged objects and heat-shrinking properties of heat-shrinkable package films, the hot airflow flowrate discharging from each airflow orifice of the hot airflow box that corresponds to a heat-shrinking packaging site, and also discharging hot airflow therefrom or not, and thus leading to a problem and drawback of inhomogeneity of the heat-shrinking packaging quality of the packaged object and incapability of further improving.

In addition, Taiwan Utility Model M264494, which provides an improved structure of hot baking machine, and Taiwan Utility Model M572035, which provides a pre-shrinking oven structure for fitting heat-shrinkable film label, propose another typical known package thermal-shirking oven technology, wherein replacing a heat-conducting board (4) and a heat-isolating board (5) of a hot baking machine (1) disclosed in Taiwan Utility Model M264497 and a replacement operation of a shielding plate (60) of a thermal-shrinking oven body (10) disclosed in Taiwan Utility Model 572035 both require the hot baking machine (1) and the thermal-shrinking oven body (10) to be shut down and cooled to drop to a safe temperature before the replacement of the heat-conducting board (4) and the heat-isolating board (5) and the replacement of the shielding plate (60) can be carried out, making the operations for replacement of the heat-conducting board (4) and the heat-isolating board (5) and replacement of the shielding plate (60) complicated and difficult. Further, for control of the hot airflow flowrate and control of airflow discharging or not, the two documents are incapable of precisely controlling and still suffer, similar to the prior art package thermal-shrinking ovens, greatly increasing the cost of equipment replacement for replacement of the heat-conducting board (4) and the heat-isolating board (5) and the replacement of the shielding plate (60) and requiring professional technicians for calibration and replacement for the replacement of the heat-conducting board (4) and the heat-isolating board (5) and the replacement of the shielding plate (60) and the replacement operation being only carried out when the package thermal-shrinking oven has been shut down and the internal temperature thereof has dropped to a safe level, thereby making the replacement operations of the internal components for the hot baking machine (1) and the thermal-shrinking oven body (10) complicated and difficulty and consuming additional work hours, human labor, and cost.

SUMMARY OF THE INVENTION

The previously discussed known package thermal-shrinking oven or those from the above-mentioned patents all suffer problems and drawbacks that it is impossible to adjust the hot airflow flowrate corresponding to a heat-shrinking packaging site inside a package thermal-shrinking oven in real time, and also being uncontrollable for discharging the hot airflow or not, according to different shapes and sizes of various packaged objects and heat-shrinking packaging properties of heat-shrinkable package film so as not to allow the heat-shrinking packaging quality of the packaged object to further enhance, and also, an operation of swapping or replacing airflow flowrate controlling components inside the package thermal-shrinking oven, such as heat-conducting board, heat-isolating board, and shielding plate is complicated and difficult so as to greatly increase the equipment cost, and further, replacing of a hot airflow box assembly must be implemented by professional technicians for calibration and replacement, and can be performed only after the package thermal-shrinking oven has been shut down and the internal temperature has dropped to a safe temperature level, making the replacing operation of the hot airflow box even more complicated and more difficult, and consuming increased working hours, human labor, and cost, making it lacking industrial utilization and economic value.

Thus, the present invention provides an airflow orifice adjusting device of a package thermal-shrinking oven, which comprises:

- at least one airflow orifice board, the airflow orifice board being mounted to an inside surface of a hot airflow box of the package thermal-shrinking oven, the airflow orifice board being provided with series of airflow orifices, so that each of the airflow orifice discharges a hot airflow from the hot airflow box of the package thermal-shrinking oven;
- at least one track board, the track board being mounted to an outside of the hot airflow box, the track board being formed with a plurality of track holes;
- a plurality of adjusting levers, the adjusting levers each having two ends that are respectively formed as a connecting portion and an operating portion, the connecting portion extending through the track holes of the track board, so that a leftward or rightward horizontal pushing operation performed on the operating portion drives the connecting portion to implement a corresponding reversely-directed movement in a rightward or leftward direction; and
- a plurality of airflow-blocking adjusting plate, each of the airflow-blocking adjusting plate being mounted on the airflow orifice board, the airflow-blocking adjusting plates being each formed with a plurality of adjusting orifices, such that each of the adjusting orifices corresponds to one of the airflow orifices of the airflow orifice board, the airflow-blocking adjusting plates each having an end connected to the connecting portion of a corresponding one of the adjusting levers to allow the airflow-blocking adjusting plate to be controlled by the leftward or rightward horizontal pushing operation of the operating portion of the adjusting lever to make the airflow-blocking adjusting plate performing reversely directed displacing in a rightward or leftward direction to cause each of the adjusting orifices to completely or partially match with or completely un-match with a corresponding one of the airflow orifices of the airflow orifice board, so that a hot airflow flowrate discharging through each of the airflow orifices of the airflow orifice board, and discharging of the hot airflow or not, is adjustable and controllable.

Further, in the above described airflow orifice adjusting device of the package thermal-shrinking oven, each of airflow orifices of the airflow orifice board comprises an elongated hole.

In the above described airflow orifice adjusting device of the package thermal-shrinking oven, the track holes of the track board comprise a horizontal elongated hole.

In the above described airflow orifice adjusting device of the package thermal-shrinking oven, the track board is provided with a through axle hole, and the through axle hole longitudinally extends across each of the track holes, and the operating portion of each of the adjusting levers is formed with a through aperture, the through aperture corresponding to and matching with the through axle hole of the track board, so that a rotation axle penetrates through the through axle hole of the track board and the through aperture of the operating portion of each of the adjusting levers to allow the rotation axle to function as a support point for the leftward or rightward horizontal pushing operation of the operating portion of each of the adjusting levers.

In the above described airflow orifice adjusting device of the package thermal-shrinking oven, at least one scale board is mounted to a bottom portion of the track board, and the scale board is provided thereon with a plurality of markings to provide an indication for a displacement of a horizontal leftward or rightward operation of the operating portion at one end of each of the adjusting levers and to serve as an indication of an operation position of each of the airflow orifices of the airflow orifice board for completely or partially matching with or completely un-matching with a corresponding one of the airflow orifices.

In the above described airflow orifice adjusting device of the package thermal-shrinking oven, the markings of the scale board mounted to the bottom portion of the track board respectively indicate states that the airflow orifices of the airflow orifice board completely discharge a full flowrate of the hot airflow, partially discharge a half flowrate of the hot airflow, and are completely blocked for discharging no hot airflow.

In the above described airflow orifice adjusting device of the package thermal-shrinking oven, one end of the operating portion of each of the adjusting levers is provided with at least one pivotal connection portion, and the pivotal connection portion is formed with a pivotal connection hole, and an end of the connecting portion of the adjusting levers that is not connected with the corresponding airflow-blocking adjusting plate is formed with at least one joining opening to receive the pivotal connection portion of the operating portion to correspondingly insert therein, and the joining opening having top and bottom that are each formed with a connecting threaded hole to correspond to the pivotal connection hole of the operating portion to receive at least one bolt extending through and fastened to the connecting threaded holes and the pivotal connection hole to function as a center of rotation axle of an interlinked operation between the operating portion and the connecting portion.

In the above described airflow orifice adjusting device of the package thermal-shrinking oven, the adjusting orifices of the airflow-blocking adjusting plates comprise an elongated hole.

In the above described airflow orifice adjusting device of the package thermal-shrinking oven, one end of the connecting portion of each of the adjusting levers is provided with a connecting threaded rod, and one end of the airflow-blocking adjusting plate is formed with a threaded hole, which is corresponding to and fastened to the threaded rod of the connecting portion.

The efficacy of the airflow orifice adjusting device of the package thermal-shrinking oven according to the present invention is that a combination of the airflow orifice board, the track board, the plurality of adjusting levers, and the plurality of airflow-blocking adjusting plate enables precise control the airflow orifices of the airflow orifice board and the adjusting orifices of the airflow-blocking adjusting plates to be completely matching, partially matching, or completely un-matching by means of a simple operation of pushing the operating portions of the adjusting levers in a horizontally leftward or rightward direction, so that the hot airflows discharging from the hot airflow box of the package thermal-shrinking oven through the airflow orifices of the airflow orifice board is adjustable in a stepless manner in respect of the flowrate thereof and is controllable for blocking and not discharging hot airflow, and, based on different shapes and sizes of various packaged objects and heat-shrinking packaging properties of different heat-shrinkable package films, an optimum adjustment of the hot airflow flowrate corresponding to the heat-shrinking packaging site inside the package thermal-shrinking oven and control of discharging a hot airflow can be realized, and particularly, the operating portions of the adjusting levers are arranged, following the arrangement of the track boards, to be located outside of the package thermal-shrinking oven, so that without any need to shut down the package thermal-shrinking oven first, an operator may safely operate, at outside of the package thermal-shrinking oven, the operating portions of the adjusting levers to horizontally move leftward or rightward, and consequently, by means of such a way of easy and safe operation and accurate adjusting, without shutting down the machine, the hot airflow flowrate discharging through the airflow orifices of the airflow discharging board and control of discharging airflow or not, a great amount of working hours, human labor, and facility expenditure can be saved, and time-efficient and enhanced heat-shrinking packaging quality for heat-shrinking packaging of a packaged object in the package thermal-shrinking oven can be improved without shutting down machine, so as to completely eliminate the problems of drawbacks of the prior art and each of the patent documents to thereby increase the industrial utilization and economic value of the present invention.

DETAILED DESCRIPTION OF THE PREFERRED EMBODIMENTS

Figure 1:
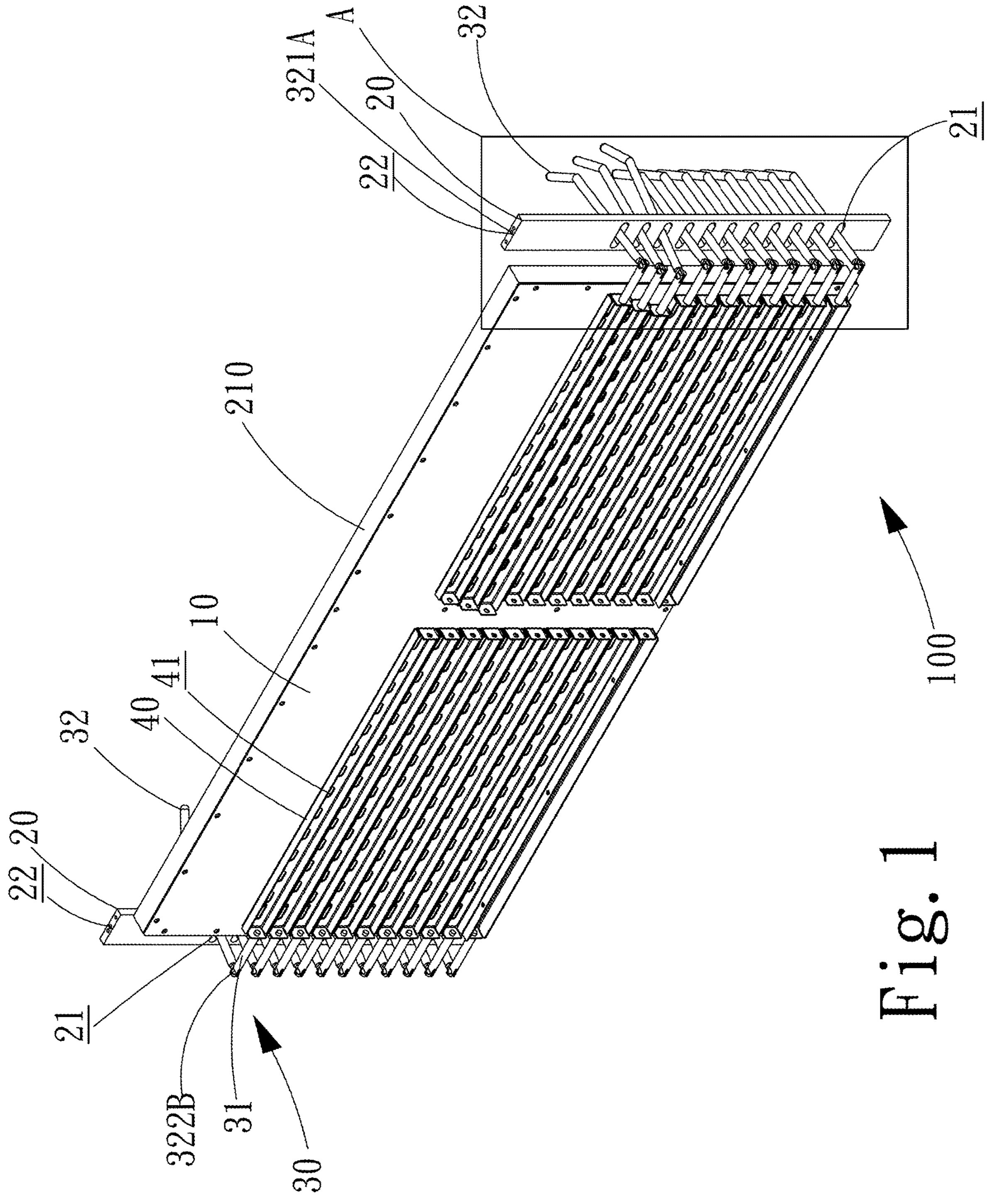
FIG. 1 is a perspective view showing an airflow orifice adjusting device of a package thermal-shrinking oven according to a first embodiment of the present invention.
Figure 2:
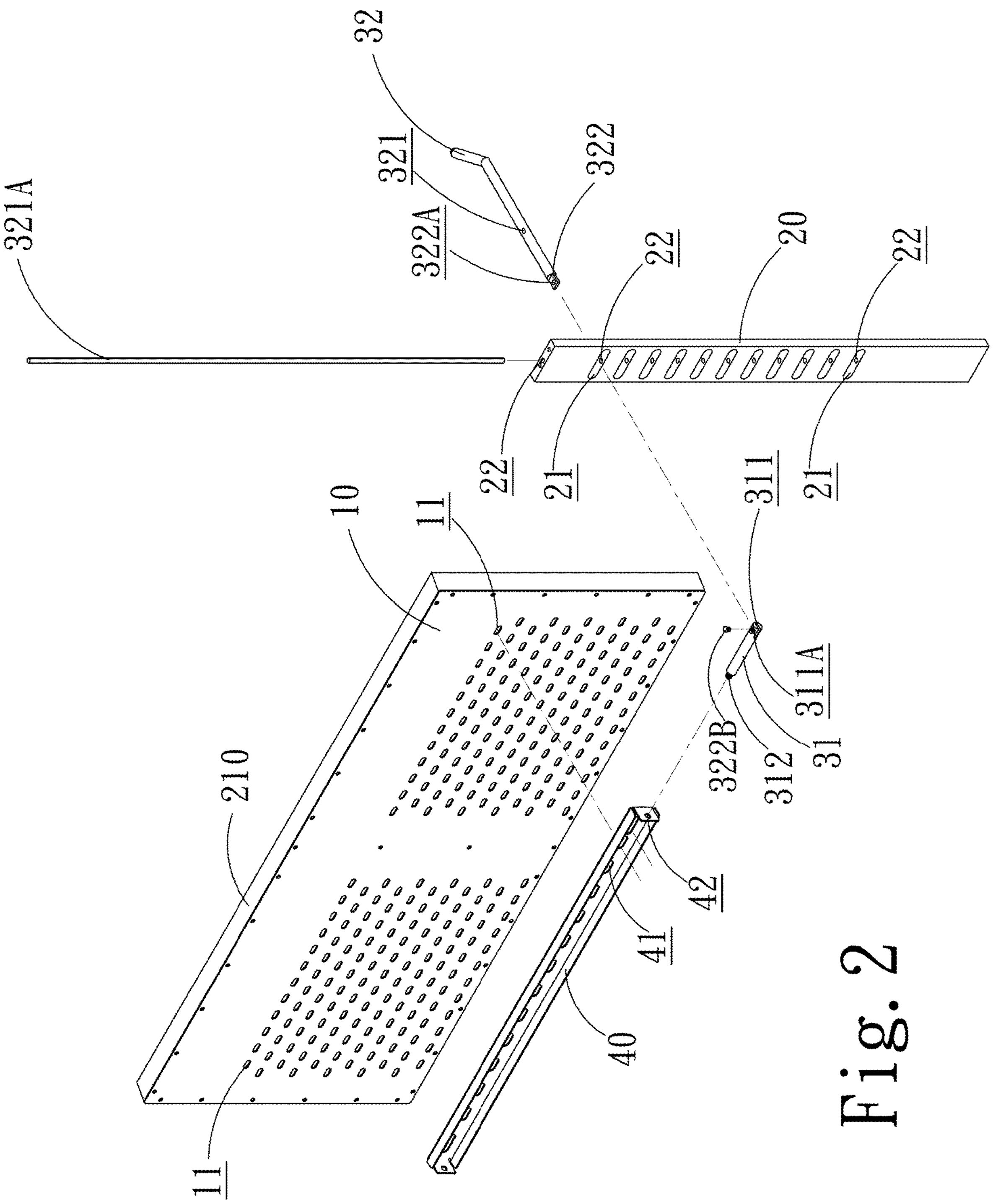
FIG. 2 is an exploded view showing the airflow orifice adjusting device of the package thermal-shrinking oven according to the present invention.
Figure 3:
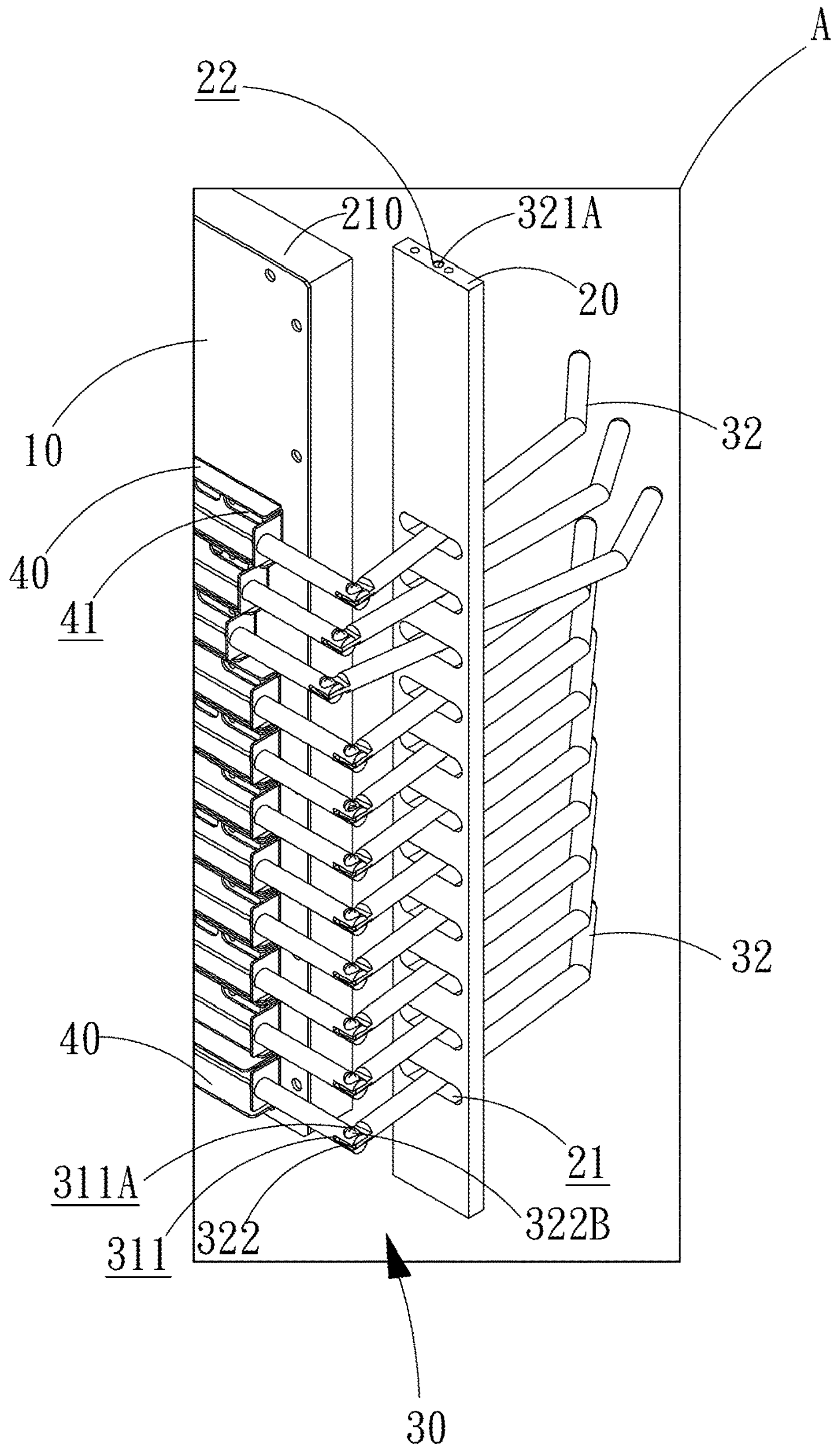
FIG. 3 is an enlarged view of portion A of FIG. 1, in which a structural arrangement among a track board, adjusting levers, and airflow-blocking adjusting plates is shown.
Figure 4:
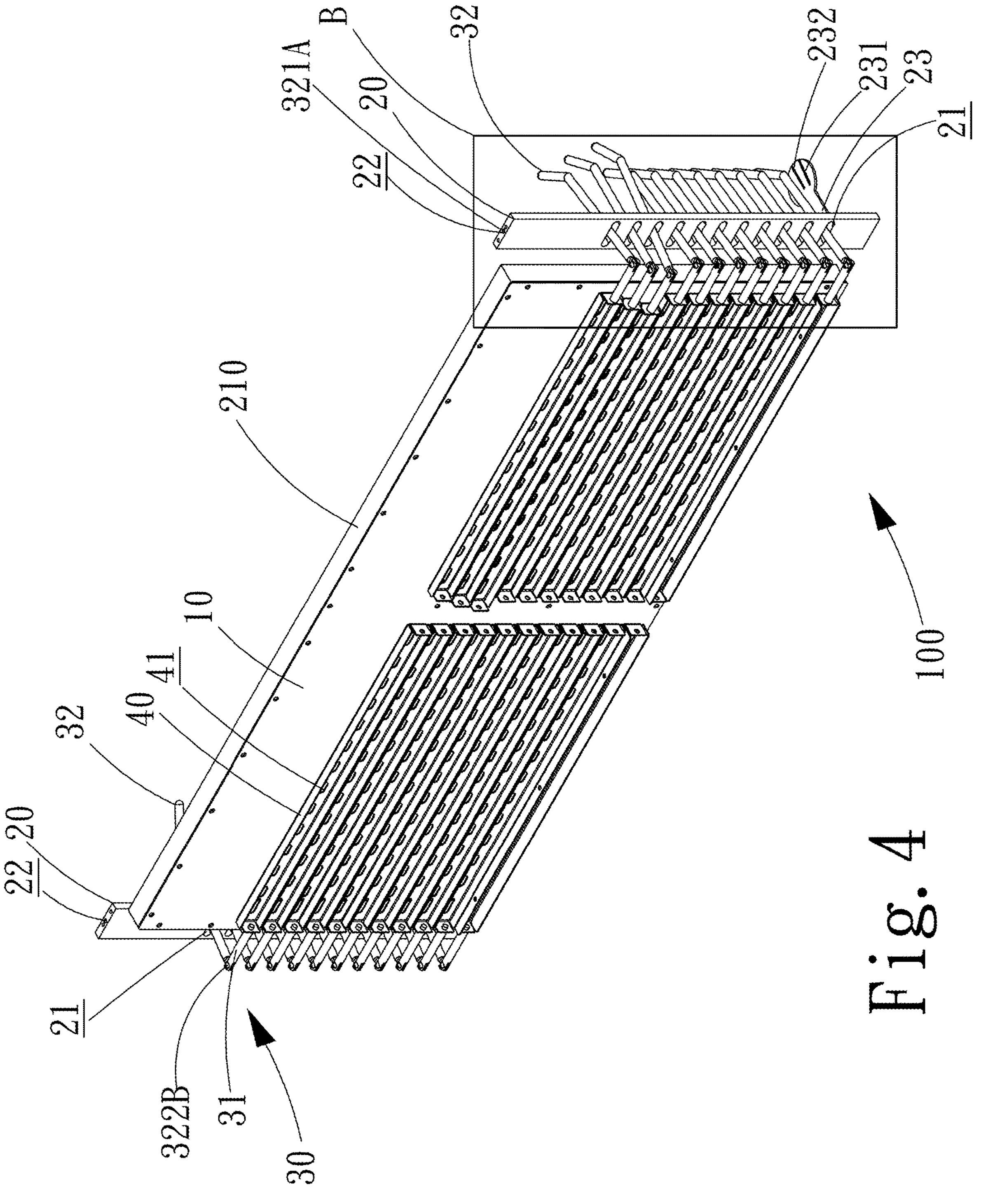
FIG. 4 shows a second embodiment of the present invention.
Figure 5:
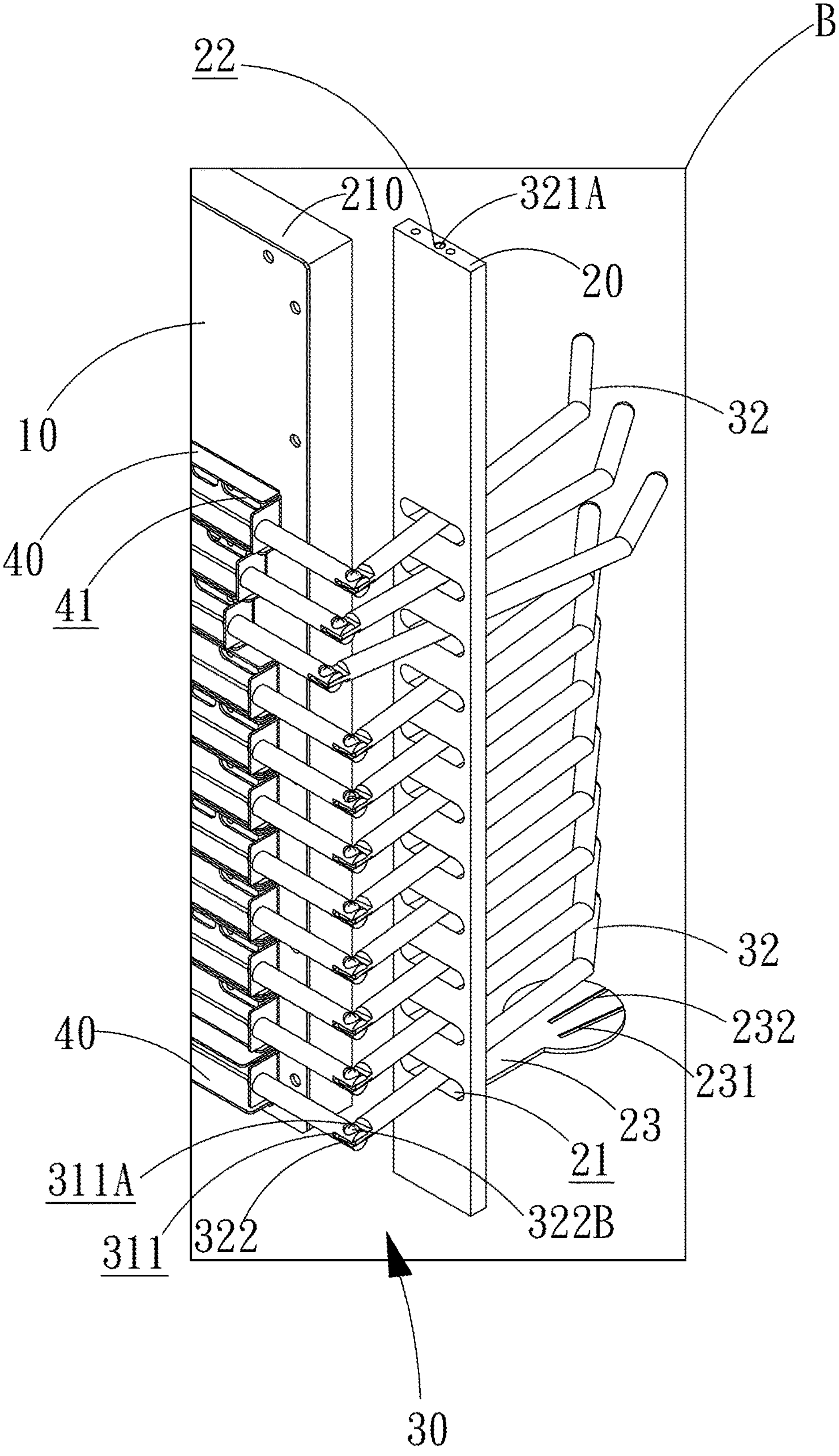
FIG. 5 is an enlarged view of portion B of FIG. 4, in which a structural arrangement among a track board, a scale board, adjusting levers, and airflow-blocking adjusting plates is shown.
Figure 6:
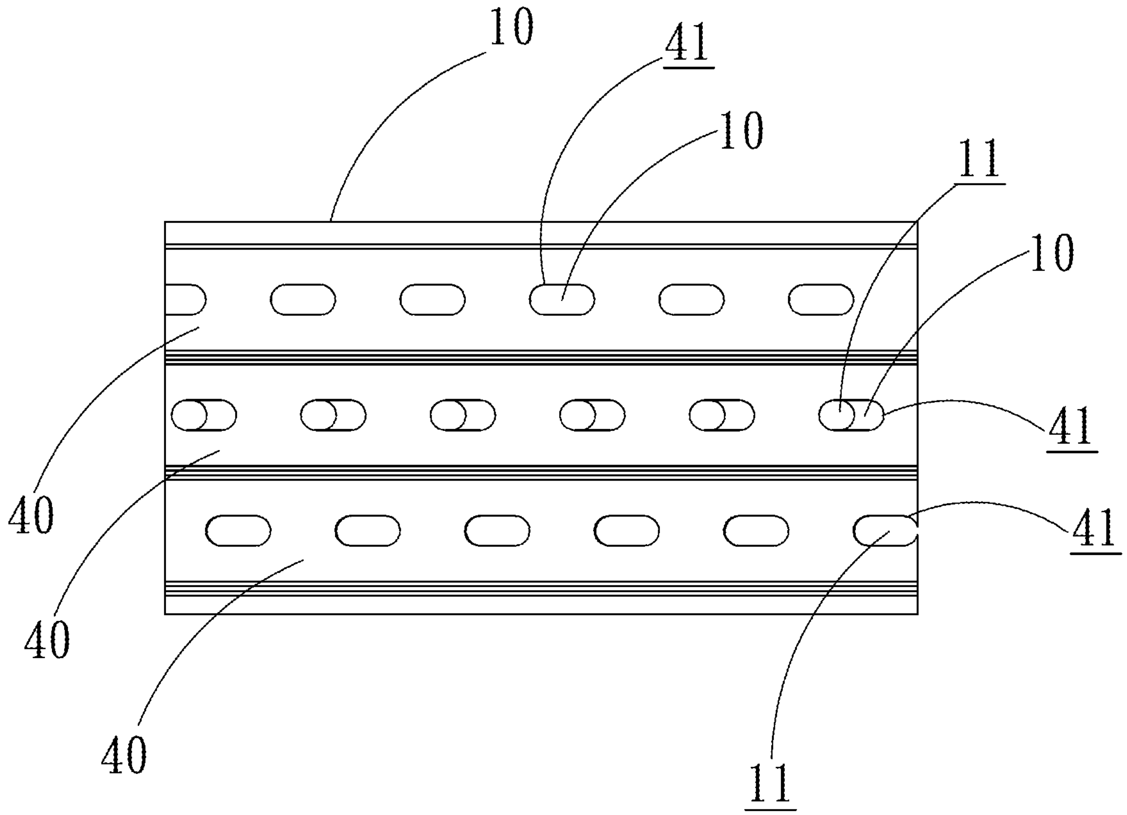
FIG. 6 is an enlarged view of a portion of a structure for controlling hot airflow discharging, illustrating control for completely matching, partially matching, and completely blocking between airflow orifices of an airflow orifice board and adjusting orifices of the airflow-blocking adjusting board.
Figure 7:
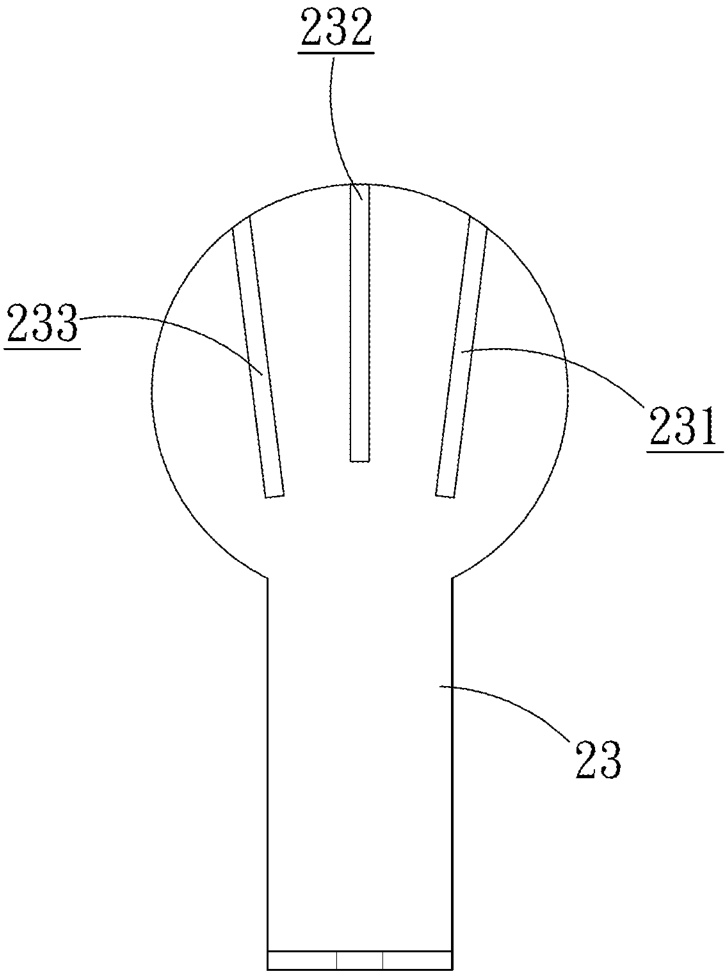
FIG. 7 is a top plan view, in an enlarged form, showing the scale board of FIG. 5.

Referring firstly to FIGS. 1, 2, and 3, an airflow orifice adjusting device 100 of a package thermal-shrinking oven according to a first embodiment of the present invention comprises at least one airflow orifice board 10. The airflow orifice board 10 is mounted to an inside surface of a hot airflow box 210 of a package thermal-shrinking oven 200 (as shown in FIG. 7), and the airflow orifice board 10 is provided with series or arrays of airflow orifices 11, so that each of the airflow orifices 11 discharges a hot airflow from the hot airflow box 210 of the package thermal-shrinking oven 20. The airflow orifices 11 are not limited to any specific shape, and an elongated hole is taken as an example for illustration of the airflow orifices 11 in the present invention.

At least one track board 20 is provided, and the track board 20 is mounted to an outside of the hot airflow box 210. The track board 20 is formed with a plurality of track holes 21, and the track board 20 is provided with a through axle hole 22, such that the through axle hole 22 longitudinally penetrates across each of the track holes 21. The track holes 21 are not limited to any specific shape, and a horizontal elongated hole is taken as an example for illustration in the present invention.

A plurality of adjusting levers 30 are provided, and each of the adjusting levers 30 has two ends that are respectively formed as a connecting portion 31 and an operating portion 32. The connecting portions 31 extend through the track holes 21 of the track board 20. The connecting portions 31 each have two ends that are respectively provided with a joining opening 311 and a connecting threaded rod 312. The joining opening 311 is defined between a top and a bottom that are each formed with a connecting threaded hole 311A. The operating portion 32 is formed in a middle thereof with a through aperture 321, and the through aperture 321 corresponds to and matches with the through axle hole 22 of the track board 20, so that a rotation axle 321A penetrates through the through axle hole 22 of the track board 20 and the through aperture 321 of the operating portion 32 of each of the adjusting levers 30 to allow the rotation axle 321A to function as a support point for a leftward or rightward horizontal pushing operation of the operating portion 32 of each of the adjusting levers 30 to allow the operating portion 32 to be operated for horizontally pushing leftward or rightward. One end of the operating portion 32 is provided with at least one pivotal connection portion 322, and the pivotal connection portion 322 is formed with a pivotal connection hole 322A. The pivotal connection portion 322 of the operating portion 32 is corresponding to and insertable into the joining opening 311 at one end of the connecting portion 31 to have the pivotal connection hole 322A corresponding to and matching with the connecting threaded holes 311A at the top and the bottom of the joining opening 311 of the connecting portion 31. At least one bolt 322B penetrates through the connecting threaded holes 311A and the pivotal connection hole 322A. The bolt 322B functions as a center of rotation axle of an interlinked operation between the operating portion 32 and the connecting portion 31, so that the connecting portion 31 is driven by the leftward or rightward horizontal pushing operation of the operating portion 32 to make the connecting portion 31 performing a reversely directed horizontal motion in a rightward or leftward direction.

A plurality of airflow-blocking adjusting plates 40 are provided, and each of the airflow-blocking adjusting plates 40 is mounted on the airflow orifice board 10, and the airflow-blocking adjusting plates 40 are each formed with a plurality of adjusting orifices 41, such that each of the adjusting orifices 41 corresponds to one of the airflow orifices 11 of the airflow orifice board 10. The adjusting orifices 41 are not limited to any specific shape, and an elongated hole is taken as an example for illustration in the present invention. The airflow-blocking adjusting plates 40 are each formed, in one end thereof, with a threaded hole 42, which is corresponding to and connected with the connecting threaded rod 312 at one end of the connecting portion 31 of a corresponding one of the adjusting levers 30 to allow the airflow-blocking adjusting plate 40 to be controlled by the leftward or rightward horizontal pushing operation of the operating portion 32 of the adjusting lever 30 to make the airflow-blocking adjusting plate 40 performing reversely directed displacing in a rightward or leftward direction to cause each of the adjusting orifices 41 to completely or partially match with or completely un-match with a corresponding one of the airflow orifices 11 of the airflow orifice board, so that a hot airflow flowrate discharging through each of the airflow orifices 11 of the airflow orifice board 10, and discharging of the hot airflow or not, can be adjusted and controlled.

Referring to FIGS. 4, 5, 6, and 7, an airflow orifice adjusting device 100 of a package thermal-shrinking oven is provided according to a second embodiment of the present invention, in which at least one scale board 23 is shown mounted to a bottom portion of the track board 20. The scale board 23 is provided thereon with a plurality of markings 231, 232, and 233 (as shown in FIG. 7) to provide an indication for a displacement of horizontal leftward or rightward operation of the operating portion 32 at one end of each of the adjusting levers 30 and also to serve as an indication of an operation position of each of the adjusting orifices 41 of the airflow-blocking adjusting plates 40 for completely or partially matching with or completely un-matching with a corresponding one of the airflow orifices 11 of the airflow orifice board 10. For example, as an example for illustration of the present invention, the operating portion 32 corresponding to the marking 231 of the scale board 23 indicates an operation position where each of the adjusting orifices 41 of the airflow-blocking adjusting plates 40 is completely matching with a corresponding one of the airflow orifices 11 of the airflow orifice board 10 (as being shown by the location of the third row in FIG. 6), meaning the airflow orifice 11 of the airflow orifice board 10 in a state of completely discharging for a full flowrate of the hot airflow; similarly, for example, the markings 232 and 233 of the scale board 23 respectively indicate operation positions where each of the adjusting orifices 41 of the airflow-blocking adjusting plates 40 is partially matching with and is completely un-matching with a corresponding one of the airflow orifices 11 of the airflow orifice board 10 (as being shown by the second row and the first row in FIG. 6), meaning the airflow orifice 11 of the airflow orifice board 10 in a state of partially discharging for a half flowrate of the hot airflow and a state of being completely blocked for discharging no hot airflow. The above description of adjusting of the discharged amount of hot airflow as indicated by the markings 231, 232 and 233 of the scale board 23 is provided as an illustrative example for operation of the present invention, but is not limited thereto, for example the number of the markings 231, 232 and 233 of the scale board 23 being increased, and the spacing distance among them being shortened, enabling the airflow orifices 11 of the airflow orifice board 10 to provide a more accurate, and, in an extremely situation, stepless control of the discharging flowrate of the hot airflow.

Figure 8:
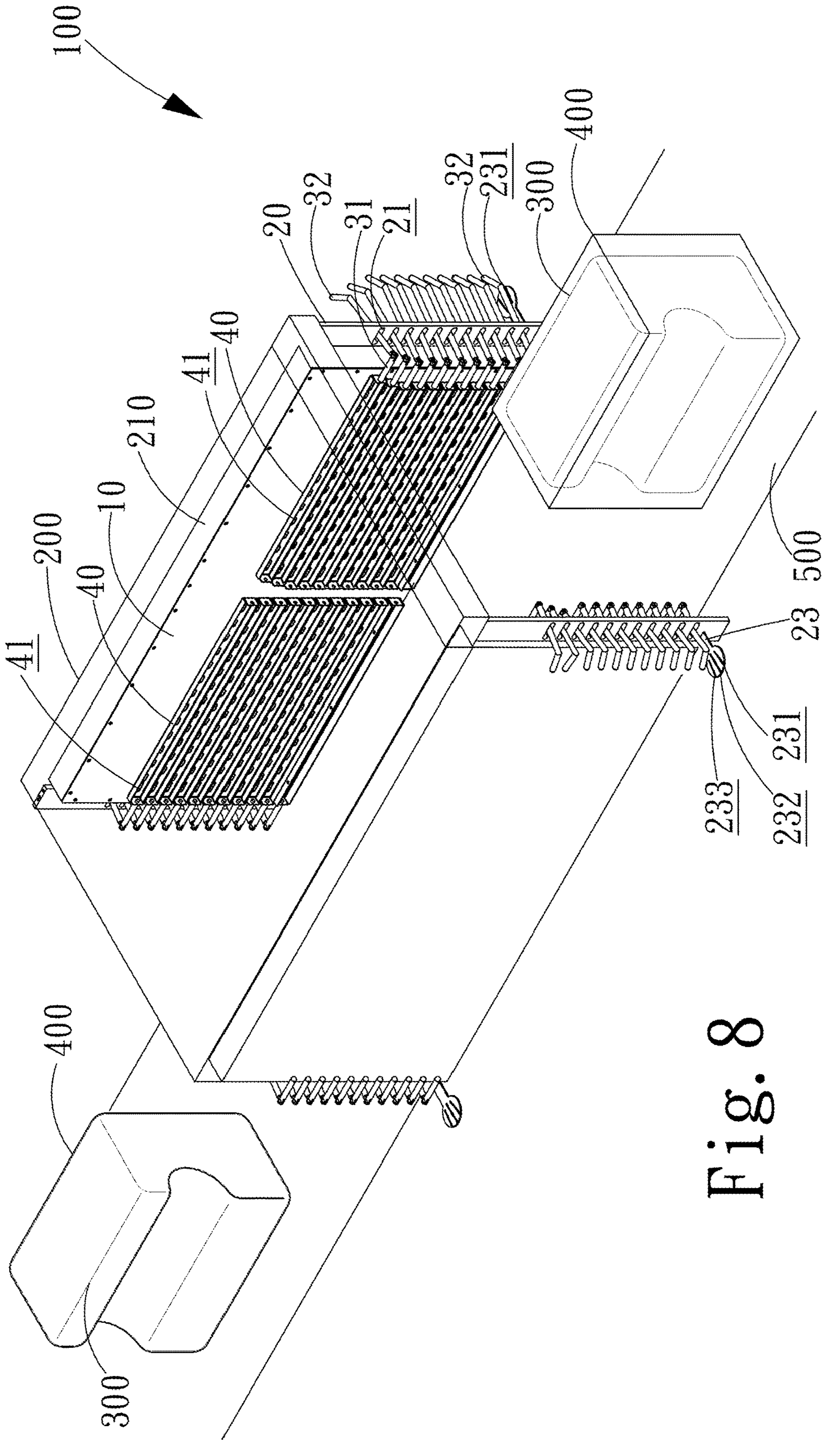
FIG. 8 is a schematic view illustrating a first illustrative application of the airflow orifice adjusting device of the package thermal-shrinking oven according to the present invention.

Referring to FIG. 8, a first illustrative example of application of the airflow orifice adjusting device 100 of the package thermal-shrinking oven according to the present invention is shown, in which a packaged object 300 is shown sleeved, on the outside thereof, with a heat-shrinkable package film 400, and is conveyed by a packaging conveyor belt 500 arranged under the package thermal-shrinking oven 200 into an interior of the package thermal-shrinking oven 200, so that, according to the packaged object 300 and the heat-shrinking packaging property of the heat-shrinkable package film 400, by means of the leftward or rightward horizontal pushing operation performed on the operating portion 32 of each one of the adjusting levers 30, each of the adjusting orifices 41 of the airflow-blocking adjusting plate 40 that corresponds to said each one of the adjusting levers 30 is caused to completely or partially match with or completely un-match with the airflow orifice board 10, in order to do adjustment for controlling a heat-shrinking packaging site and a hot airflow flowrate and discharging of a hot airflow or not to an optimum state, to thereby set the heat-shrinking packaging quality of the packaged object 300 as being packaged by the heat-shrinkable package film 400 to the optimum state. If the shape or size of the packaged object 300 changes or a heat-shrinkable package film 400 having a different heat-shrinking packaging property is applied (not illustrated), there is no need to shut down the package thermal-shrinking oven 200 and it only needs to horizontally push the operating portion 32 of each of the adjusting levers 30 in a leftward or rightward direction to allow the heat-shrinking packaging operation to be continuously performed according to the different shape or size of the packaged object 300 or the different heat-shrinking packaging property of Z the heat-shrinkable package film 400.

Figure 9:
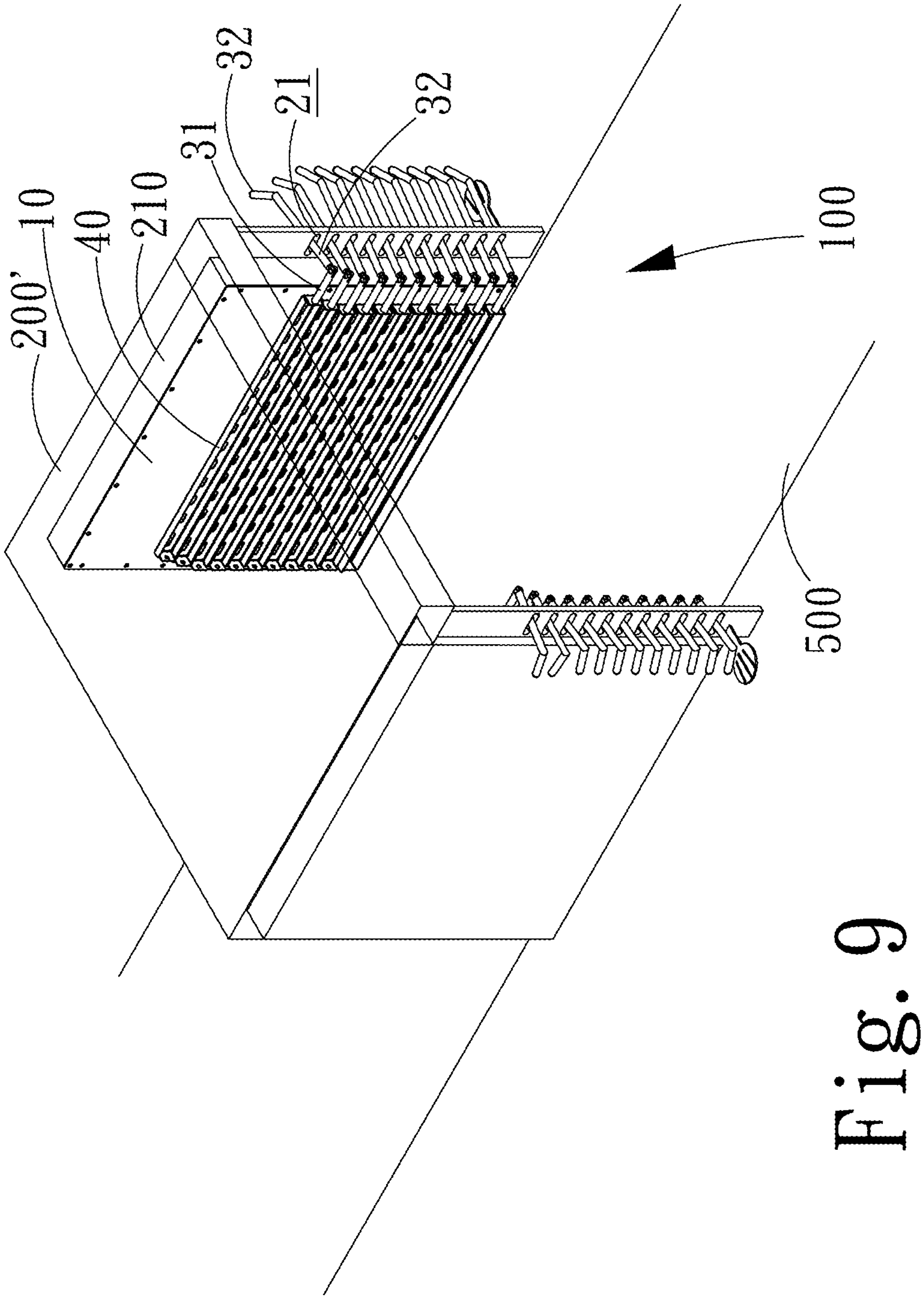
FIG. 9 is a schematic view illustrating a second illustrative application of the airflow orifice adjusting device of the package thermal-shrinking oven according to the present invention.

Further referring to FIG. 9, a second illustrative example of application of the airflow orifice adjusting device 100 of the package thermal-shrinking oven according to the present invention is shown, in which a state of being applied to a small-sized package thermal-shrinking oven 200' is provided, wherein the airflow orifice board 10, the track board 20, the adjusting levers 30, and the airflow-blocking adjusting plates 40 are cut by half in respect of size or quantity, such that the adjusting levers 30 are arranged in a one-side operating mode that is applicable to a field or on-site heat-shrinking packaging operation for a temporary custom-made small-sized packaged object 300.

The airflow orifice adjusting device 100 of the package thermal-shrinking oven according to the present invention is shown in FIGS. 1-9, wherein the description and drawings are provided for easy explanation of the technical contents and technical measures of the present invention, and the preferred embodiments so described provide only a fraction of the present invention and are not intended for constraining the scope thereof, and further any equivalent substitute and modification of structure and component of the details of the present invention are considered failing within the scope of the present invention as defined solely by the appended claims.

What is claimed is:

1. An airflow orifice adjusting device of a package thermal-shrinking oven, comprising:

at least one airflow orifice board, the airflow orifice board being mounted to an inside surface of a hot airflow box of the package thermal-shrinking oven, the airflow orifice board being provided with series of airflow orifices, so that each of the airflow orifice discharges a hot airflow from the hot airflow box of the package thermal-shrinking oven;

at least one track board, the track board being mounted to an outside of the hot airflow box, the track board being formed with a plurality of track holes;

a plurality of adjusting levers, the adjusting levers each having two ends that are respectively formed as a connecting portion and an operating portion, the connecting portion extending through the track holes of the track board, so that a leftward or rightward horizontal pushing operation performed on the operating portion drives the connecting portion to implement a corresponding reversely-directed movement in a rightward or leftward direction; and a plurality of airflow-blocking adjusting plates, each of the airflow-blocking adjusting plate being mounted on the airflow orifice board, the airflow-blocking adjusting plates being each formed with a plurality of adjusting orifices, such that each of the adjusting orifices corresponds to one of the airflow orifices of the airflow orifice board, the airflow-blocking adjusting plates each having an end connected to the connecting portion of a corresponding one of the adjusting levers to allow the airflow-blocking adjusting plate to be controlled by the leftward or rightward horizontal pushing operation of the operating portion of the adjusting lever to make the airflow-blocking adjusting plate performing reversely directed displacing in a rightward or leftward direction to cause each of the adjusting orifices to completely or partially match with or completely un-match with a corresponding one of the airflow orifices of the airflow orifice board, so that a hot airflow flowrate discharging through each of the airflow orifices of the airflow orifice board, and discharging of the hot airflow or not, is adjustable and controllable.

2. The airflow orifice adjusting device of the package thermal-shrinking oven according to claim 1, wherein each of airflow orifices of the airflow orifice board comprises an elongated hole.

3. The airflow orifice adjusting device of the package thermal-shrinking oven according to claim 1, wherein the track holes of the track board comprise a horizontal elongated hole.

4. The airflow orifice adjusting device of the package thermal-shrinking oven according to claim 1, wherein the track board is provided with a through axle hole, and the through axle hole longitudinally extends across each of the track holes, and the operating portion of each of the adjusting levers is formed with a through aperture, the through aperture corresponding to and matching with the through axle hole of the track board, so that a rotation axle penetrates through the through axle hole of the track board and the through aperture of the operating portion of each of the adjusting levers to allow the rotation axle to function as a support point for the leftward or rightward horizontal pushing operation of the operating portion of each of the adjusting levers.

5. The airflow orifice adjusting device of the package thermal-shrinking oven according to claim 1, wherein at least one scale board is mounted to a bottom portion of the track board, and the scale board is provided thereon with a plurality of markings to provide an indication for a displacement of a horizontal leftward or rightward operation of the operating portion at one end of each of the adjusting levers and to serve as an indication of an operation position of each of the airflow orifices of the airflow orifice board for completely or partially matching with or completely unmatching with a corresponding one of the airflow orifices.

6. The airflow orifice adjusting device of the package thermal-shrinking oven according to claim 5, wherein the markings of the scale board mounted to the bottom portion of the track board respectively indicate states that the airflow orifices of the airflow orifice board completely discharge a full flowrate of the hot airflow, partially discharge a half flowrate of the hot airflow, and are completely blocked for discharging no hot airflow.

7. The airflow orifice adjusting device of the package thermal-shrinking oven according to claim 1, wherein one end of the operating portion of each of the adjusting levers is provided with at least one pivotal connection portion, and the pivotal connection portion is formed with a pivotal connection hole, and an end of the connecting portion of the adjusting levers that is not connected with the corresponding airflow-blocking adjusting plate is formed with at least one joining opening to receive the pivotal connection portion of the operating portion to correspondingly insert therein, and the joining opening having top and bottom that are each formed with a connecting threaded hole to correspond to the pivotal connection hole of the operating portion to receive at least one bolt extending through and fastened to the connecting threaded holes and the pivotal connection hole to function as a center of rotation axle of an interlinked operation between the operating portion and the connecting portion.

8. The airflow orifice adjusting device of the package thermal-shrinking oven according to claim 1, wherein the adjusting orifices of the airflow-blocking adjusting plates comprise an elongated hole.

9. The airflow orifice adjusting device of the package thermal-shrinking oven according to claim 1, wherein one end of the connecting portion of each of the adjusting levers is provided with a connecting threaded rod, and one end of the airflow-blocking adjusting plate is formed with a threaded hole, which is corresponding to and fastened to the threaded rod of the connecting portion.

* * * * *